United States Patent [19]

Kaifu et al.

[11] Patent Number: 4,560,625

[45] Date of Patent: Dec. 24, 1985

[54] ALUMINUM ALLOY COMPOSITE MATERIALS FOR BRAZED HEAT EXCHANGERS

[75] Inventors: Masaharu Kaifu, Shimonoseki; Jun Takigawa, Ohyadaimachi; Hideo Fujimoto, Ohyadaimachi; Tomohiro Nishimura, Ohyadaimachi; Masao Takemoto, Ohyadaimachi, all of Japan

[73] Assignee: Kabushiki Kaisha Kobe Seiko Sho, Kobe, Japan

[21] Appl. No.: 578,094

[22] Filed: Feb. 8, 1984

[30] Foreign Application Priority Data

Feb. 14, 1983 [JP] Japan .............................. 58-23546[U]

[51] Int. Cl.$^4$ .............................................. B32B 15/20
[52] U.S. Cl. .................................... 428/654; 428/636; 165/180; 228/263.17
[58] Field of Search ................. 428/654, 636; 165/180; 228/263.17; 420/534

[56] References Cited

U.S. PATENT DOCUMENTS

| | | | |
|---|---|---|---|
| 3,674,448 | 7/1972 | Brown et al. | 428/654 |
| 3,891,400 | 6/1975 | Robinson | 428/654 |
| 4,146,164 | 3/1979 | Anderson et al. | 428/654 |
| 4,161,553 | 7/1979 | Vernam et al. | 428/654 |
| 4,211,827 | 7/1980 | Pryor et al. | 428/654 |

FOREIGN PATENT DOCUMENTS

| | | | |
|---|---|---|---|
| 0097514 | 8/1979 | Japan | 428/654 |
| 0110653 | 7/1983 | Japan | 428/654 |
| 59-71998 | 4/1984 | Japan | 420/534 |
| 59-150052 | 8/1984 | Japan | 428/654 |

*Primary Examiner*—L. Dewayne Rutledge
*Assistant Examiner*—Deborah Yee
*Attorney, Agent, or Firm*—Oblon, Fisher, Spivak, McClelland & Maier

[57] ABSTRACT

Aluminum alloy composite materials for brazed heat exchangers are described, which comprise an Al core alloy essentially consisting of predetermined amounts of Si, Mg, Cu and at least one element selected from Mn, Cr and Zr, the balance being Al and inevitable impurities, and an Al alloy clad layer formed on one side of the core alloy which is in contact with an aqueous heat transfer medium. The clad layer has a thickness 3–20% based on the thickness of the composite material and a less-noble corrosion potential of 20–100 mV than the core alloy. A filler alloy may be formed on the other side of the core alloy.

8 Claims, No Drawings

ALUMINUM ALLOY COMPOSITE MATERIALS FOR BRAZED HEAT EXCHANGERS

BACKGROUND OF THE INVENTION

1. Field of the Invention

This invention relates to brazed heat exchangers and more particularly to aluminium alloy composite or clad materials for use in brazed heat exchangers. These materials have improved water corrosion resistance properties and good mechanical strength.

2. Description of the Prior Art

Aluminum alloy brazed heat exchangers are widely used as condensers and evaporators in automobile air conditioners. However, Al alloys are rarely used as members for heat exchangers, such as, for example, in radiator header tubes in which a water coolant is used. The reason for this is that conventional Al alloys have unsatisfactory water corrosion resistance properties. Thus when the quality of the coolant is bad, the alloys are apt to undergo break-through corrosion even in a very short period of time, thereby causing a vital drawback in it's application as a member for heat exchangers. Accordingly, Al alloys which are applied for these purposes are strongly demanded to have improved water corrosion resistance properties. Moreover, there is also a strong demand for these heat exchangers to be light weight. In order to meet this demand, Al alloys should have high strength characteristics sufficient to make thin members.

SUMMARY OF THE INVENTION

It is an object of the present invention to provide Al alloy composite or clad materials for brazed heat exchangers which meet the above demands.

It is another object of the present invention to provide Al alloy composite materials for brazed heat exchangers which comprise a combination of a core alloy made of a specific alloy composition and an Al alloy layer formed on one side of the core alloy, which side is in contact with an aqueous heat transfer medium whereby water corrosion resistance and mechanical strength properties are improved.

It is a further object of the invention to provide a cladded aluminum alloy or a composite material for brazed heat exchangers in which an Al alloy layer formed or clad on one side of a core alloy has a defined thickness and a less-noble potential than the core alloy.

The above objects can be achieved, according to the present invention, by an Al alloy composite material for brazed heat exchangers which comprises a core alloy essentially consisting of 0.2–1.0 wt% of Si, 0.1–0.5 wt% of Mg, the weight ratio of Si to Mg being in the range of 1–2.5, 0.2–1.0 wt% of Cu, at least one element selected from the group consisting of Mn, Cr and Zr, each contained in an amount of 0.05–0.5 wt%, and the balance being Al and inevitable impurities, and an Al clad skin layer formed on one side of the core alloy or core which is brought into contact with an aqueous heat transfer medium, the clad layer having a thickness 3–20% of the thickness of the composite material and a less-noble potential by 20–100 mV than the core alloy. The composite material is usually in the form of a sheet or plate having a thickness of 0.3 to 2 mm. In a preferred aspect, the composite material has a layer of a filler alloy made of Al—Si or Al—Si—Mg on the side opposite to the clad layer by which the Al alloy composite material can be readily brazed as it is without need of additional brazing materials.

DETAILED DESCRIPTION AND PREFERRED EMBODIMENTS OF THE INVENTION

The Al alloys for the core alloy contain, aside from aluminium and inevitable impurities, the above-defined critical amounts of elements.

Copper is an essential element which improves mechanical strength and corrosion potential of the Al alloy. If Cu is contained in amounts less than 0.2 wt% (hereinafter referred simply as %), such an improvement cannot be achieved. It will be noted that although Cu is an element serving to considerably lower corrosion resistance of Al alloys, the adverse influence of Cu on corrosion resistance after heating on brazing is remarkably reduced. Accordingly, Cu can be effectively used to improve mechanical strength and corrosion potential of the alloy. In this connection, however, if the Cu content exceeds 1.0%, the action of impeding corrosion resistance becomes marked in coexistence with other elements such as Mg or Si. Accordingly, a content of Cu in the alloy is determined to be in the range of 0.2–1.0%

Contents of Si and Mg are determined to be in ranges of 0.2–1.0% and 0.1–0.5%, respectively, provided that a Si/Mg ratio on the weight basis is in the range of 1–2.5. When heated upon brazing, Si and Mg are dissolved in the matrix and subsequent aging at room temperature allows fine particles of $Mg_2Si$ to precipitate, resulting in an increase of mechanical strength. The Si/Mg ratio in the $Mg_2Si$ is 0.58. In case the cooling velocity is very high, as in water quenching, the effect of improving the strength becomes maximum at a Si/Mg ratio of 0.58. However, in brazing of Al alloy composite materials, it is practically impossible to have the cooling velocity as high as in water quenching. In order to cause the Al alloy to be improved in strength at high level under such cooling conditions, contents of Si and Mg have to be so set such that a Si/Mg ratio is over 1 so as to suppress the susceptibility to quenching. The improving effect does not increase when the Si/Mg ratio exceeds 2.5 but there is the tendency of impeding brazing due to an excess of Si. Absolute amounts of Mg and Si are also important. If Mg is used in an amount less than 0.1% or Si is less than 0.2%, $Mg_2Si$ cannot be formed sufficiently, and therefore the satisfactory effect of improving the strength is not developed. On the other hand, when a content of Mg exceeds 0.5% or a content of Si exceeds 1.0%, the brazing property decreases.

Manganese, Cr and Zr are elements which serve to suppress recrystallization and improve the brazing property. For the purpose of the invention, at least one element selected from Mn, Cr and Zr should be added in an amount not less than 0.05% for each element. However, if Mn is added too much, the resulting alloy undesirably increases in susceptibility to intergranular corrosion. Use of Cr and/or Zr in excess results in formation of giant intermetallic compounds, thus lowering the processability. Accordingly, these elements should be added in amounts not greater than 0.5%, respectively, when used singly or in combination.

Titanium has the effect of preventing heat cracks upon casting of the Al alloy. When its content exceeds 0.1%, giant intermetallic compounds crystallize, thereby lowering the processability. Addition of Ti in the range of 0.01–0.1% has little influence on the processability and corrosion resistance. Accordingly, Ti may be added for the purpose of preventing heat cracks.

Iron, which is inevitably contained as an impurity, should preferably be reduced in amounts as low as possible because it combines with Si, which is an element of improving strength, and separates as intermetallic compounds. An allowable amount of Fe is in the range up to about 0.5%.

Next, the clad layer serves to prevent the copper contained in the core alloy from diffusing to the surface thereof so that a concentration gradient of Cu in the clad layer is kept proper. By this, the clad layer serves as a kind of sacrificial anode and thus prevents the core alloy from corroding. If the thickness of the clad layer is less than 3% of the thickness of the composite material, there's a greater likelihood of copper diffusing to the surface thereby preventing the clad layer from effectively functioning as the sacrifical anode. On the other hand, these effects reach maxima when the thickness is about 20% of the thickness of the composite material. Over 20%, the resulting composite material becomes unsatisfactory in strength as a whole. In the practice of the invention, it is very important to determine the corrosion potential difference between a core alloy and clad layer in order to effectively develop the sacrificial anode effect. A satisfactory sacrificial anode effect cannot be attained unless the corrosion potential difference exceeds 20 mV. However, when the corrosion potential difference exceeds 100 mV, the clad layer alone selectively dissolves and thus the corrosion resistance of the composite material itself decreases. Accordingly, an Al alloy used as the clad layer should be controlled in order to attain a certain difference of corrosion potential relative to the core alloy, without impeding corrosion resistance thereof, in consideration of the chemical constituents and physical properties of the composite material.

A clad layer which is used in combination with core alloy having Cu content of about 0.5% may show a satisfactory corrosion performance even when using pure Al having a commercial purity. It is favorable to add Mn, Cr or Zr in a suitable amount ranging from 0.05–0.5% to the clad material, depending on the electrochemical characteristics of the Al core alloy used. These elements have the ability of changing the corrosion potential of Al slightly to a more noble side and are thus very beneficial for regulating the corrosion potential difference. This regulatory effect is unsatisfactory when the amounts of the respective elements are less than 0.05%. However, when contents of these elements are higher than those of the core alloy, the corrosion potential difference becomes small due to the diffusion of Cu from the core alloy toward the clad layer occurring at the time of brazing. As a result, the sacrificial anode effect of the clad material may decrease. In this sense, the content of Mn, Cr and/or Zr should be less than the content of the element in the core alloy. Accordingly, the contents of Mn, Cr and Zr in the clad layer are defined to be in ranges of 0.05–0.5%, respectively. Other elements such as Mg and Zn may also be added to the Al alloy clad layer and have the following effects. Magnesium promotes diffusion of Cu from the core alloy toward the clad layer and acts to prevent selective corrosion of the clad layer. Its effect becomes pronounced when the content of Mg is 0.05% or more. However, when the content exceeds 0.5%, the diffusion of Cu occurs excessively decreasing the corrosion resistance of the clad layer itself. Zinc acts to render the corrosion potential of the clad layer less noble and should be added if the Cu content in the core alloy is low. Amounts of Zn less than 0.1% are not favorable because the potential lowering effect cannot be expected. On the other hand, when the Zn content exceeds 1.0%, there is the fear that the resulting alloy will vaporize and scatter considerably at the time of brazing, thereby causing the furnace to be undesirably deposited with scatterings. Moreover, because the core material comprising the afore-described chemical constituents has a certain level of corrosion potential, there is little or no necessity of lowering the potential of the clad layer to such an extent as to add Zn over 1%.

As described in detail in the foregoing, a composite material of the present invention comprises a substrate of an Al alloy having a specific chemical composition, and a layer clad or formed on one side of the core alloy which is in contact with a heat transfer medium. The clad layer is made of aluminium or its alloys and has a defined cladding ratio and electrochemical characteristic to serve as a sacrificial anode. By this, water corrosion resistances of the core or composite material can be remarkably improved. In practice, the composite material may further comprise a filler alloy on the side of the core alloy opposite to the side where the clad layer is formed. The brazing layer is made of, for example, Al-Si or Al-Si-Mg. With this formation, no additional brazing material is needed in brazing operations. The composite material may be in any form such as sheets, plates, tubes and the like, having a suitable thickness determined by considering the heat-exchanging efficiency.

The present invention is described in more detail by way of example.

EXPERIMENTAL EXAMPLE

A number of Al alloys for the core alloy having compositions indicated in Table 1 and a number of Al alloys for the clad layer having compositions indicated in Table 2 were made. These different types of Al alloys were combined as indicated in Table 3, thereby making 1 mm thick composite material. Corrosion Potential differences between the core and clad materials of the respective sheets (a difference in corrosion potential in an aqueous 3.5% NaCl solution) are shown in Table 3. Further, the composite material was subjected to the following corrosion and mechanical strength tests. The results are also shown in Table 3.

Corrosion Test

The composite material was used to make test pieces for the corrosion tests by the vacuum brazing technique (595° C.×2 min). The clad layers of the respective test pieces were tested by immersing the test pieces in tap water and a corrosive solution of ASTM water +10 ppm of Cu, followed by subjecting it to a temperature cycle of 80° C.×8 hours and room temperature×16 hours for 100 cycles, repetitively. Thereafter, a depth of penetration of each test piece was determined from a microphotograph of the cross section of the test piece. The corrosion resistance values indicated in by a Table 3 stand for maximum penetration depths determined by this experiment.

Mechanical Strength

Test pieces were cut away from the respective composite materials and were heated in vacuum brazing technique (595° C.×2 min). Subsequently, the test pieces were maintained at room temperature for 20 days to permit aging, and were subjected to a tensile test in which the test was repeated five times for each piece. The values indicated in Table 3 are each an average value of five experiments.

TABLE 1

Core alloys
Chemical Constituents (%, balance of Al and inevitable impurities)

| No. | Si | Fe | Cu | Mn | Mg | Si/Mg | Cr | Zr | Ti | Remarks |
|---|---|---|---|---|---|---|---|---|---|---|
| A-1 | 0.5 | 0.3 | 0.25 | 0.3 | 0.3 | 1.67 | 0.15 | 0.15 | 0.03 | alloy of invention |
| 2 | 0.5 | 0.2 | 0.5 | 0.3 | 0.4 | 1.25 | — | — | — | alloy of invention |
| 3 | 0.3 | 0.2 | 0.5 | — | 0.3 | 1.00 | 0.3 | — | — | alloy of invention |
| 4 | 0.6 | 0.5 | 0.5 | — | 0.3 | 2.00 | — | 0.3 | 0.03 | alloy of invention |
| 5 | 0.8 | 0.3 | 0.5 | — | 0.4 | 2.00 | 0.3 | 0.15 | 0.03 | alloy of invention |
| 6 | 1.0 | 0.3 | 0.5 | 0.5 | 0.5 | 2.00 | — | 0.15 | 0.03 | alloy of invention |
| 7 | 0.5 | 0.2 | 0.7 | — | 0.2 | 2.50 | 0.15 | 0.15 | 0.03 | alloy of invention |
| 8 | 0.5 | 0.2 | 0.7 | — | 0.3 | 1.67 | — | 0.15 | 0.03 | alloy of invention |
| 9 | 0.5 | 0.2 | 1.0 | 0.3 | 0.3 | 1.67 | 0.2 | — | 0.03 | alloy of invention |
| 10 | 0.5 | 0.2 | 1.5 | — | 0.3 | 1.67 | — | 0.15 | — | alloy for comparison |
| 11 | 0.15 | 0.5 | 0.0 | 0.5 | 0.0 | — | — | 0.15 | 0.03 | alloy for comparison |
| 12 | 0.5 | 0.5 | 0.7 | — | 0.7 | 0.71 | 0.3 | — | — | alloy for comparison |
| 13 | 0.15 | 0.5 | 0.2 | 1.2 | 0.0 | — | — | — | 0.03 | JIS3003 |

TABLE 2

Al Alloys for Clad Layer
Chemical Constituents (%, Balance of Al and inevitable impurities)

| No. | Si | Fe | Cu | Mn | Mg | Zn | Cr | Zr | Remarks |
|---|---|---|---|---|---|---|---|---|---|
| B-1 | 0.07 | 0.2 | — | — | — | — | — | — | alloy of invention |
| 2 | 0.10 | 0.3 | — | 0.3 | — | — | — | — | alloy of invention |
| 3 | 0.15 | 0.5 | — | — | — | — | 0.3 | — | alloy of invention |
| 4 | 0.07 | 0.2 | — | — | — | — | — | 0.15 | alloy of invention |
| 5 | 0.07 | 0.2 | 0.15 | — | — | — | — | — | alloy of invention |
| 6 | 0.07 | 0.2 | — | — | 0.3 | — | — | — | alloy of invention |
| 7 | 0.07 | 0.2 | — | — | 0.3 | — | — | 0.15 | alloy of invention |
| 8 | 0.07 | 0.2 | 0.2 | 0.3 | — | — | — | — | alloy of invention |
| 9 | 0.07 | 0.2 | — | 0.3 | — | — | 0.15 | 0.15 | alloy of invention |
| 10 | 0.07 | 0.2 | — | — | 0.3 | 0.2 | — | — | alloy of invention |
| 11 | 0.07 | 0.2 | — | — | — | 0.5 | — | — | alloy of invention |
| 12 | 0.10 | 0.3 | — | 0.3 | 0.3 | 1.0 | — | — | alloy of invention |

Si, Fe and Cu are impurities.

TABLE 3

Composite materials and test results

| No. | Core No. | Clad No. | Cladding Rate (%) | Tensile Strength $\sigma B$ (kg/mm$^2$) | Corrosion Potential Difference Between Core & clad alloy (mV) | Corrosion Resistance Penetration Depth (mm) Tap Water | Corrosion Resistance Penetration Depth (mm) ASTM+ Cu | Remarks |
|---|---|---|---|---|---|---|---|---|
| 1 | A-1 | B-1 | 7 | 18.5 | 50 | 0.08 | 0.07 | Inventive Material |
| 2 | " | B-2 | " | 19.0 | 40 | " | " | Inventive Material |
| 3 | " | B-3 | " | 18.7 | 40 | " | " | Inventive Material |
| 4 | " | B-4 | " | 18.5 | 50 | " | " | Inventive Material |
| 5 | " | B-6 | " | 19.2 | 50 | " | " | Inventive Material |
| 6 | " | B-10 | " | 18.8 | 70 | " | " | Inventive Material |
| 7 | " | B-12 | " | 19.5 | 100 | 0.10 | 0.11 | Inventive Material |
| 8 | A-2 | B-1 | 10 | 18.9 | 70 | 0.10 | 0.10 | Inventive Material |

TABLE 3-continued

Composite materials and test results

| No. | Core No. | Clad No. | Cladding Rate (%) | Tensile Strength σB (kg/mm²) | Corrosion Potential Difference Between Core & clad alloy (mV) | Corrosion Resistance Penetration Depth (mm) | | Remarks |
|---|---|---|---|---|---|---|---|---|
| | | | | | | Tap Water | ASTM+ Cu | |
| 9 | " | B-5 | " | 19.2 | 20 | 0.15 | " | Inventive Material |
| 10 | " | B-8 | " | 19.2 | 70 | 0.10 | " | Inventive Material |
| 11 | " | B-10 | " | 19.2 | 90 | " | " | Inventive Material |
| 12 | A-3 | B-1 | 4 | 18.6 | 70 | 0.04 | 0.04 | Inventive Material |
| 13 | " | B-4 | " | 18.6 | 70 | " | " | Inventive Material |
| 14 | " | B-7 | " | 18.8 | 70 | " | " | Inventive Material |
| 15 | " | B-10 | " | 19.2 | 90 | " | " | Inventive Material |
| 16 | A-4 | B-1 | 7 | 19.5 | 70 | 0.07 | 0.07 | Inventive Material |
| 17 | " | B-3 | " | 19.5 | 60 | " | " | Inventive Material |
| 18 | " | B-9 | " | 20.1 | 50 | " | " | Inventive Material |
| 19 | A-4 | B-10 | 7 | 20.2 | 90 | 0.07 | 0.07 | Inventive Material |
| 20 | A-5 | B-1 | 3 | 21.5 | 70 | 0.08 | 0.13 | Inventive Material |
| 21 | " | " | 7 | 20.8 | 70 | 0.08 | 0.08 | Inventive Material |
| 22 | " | " | 10 | 20.0 | 70 | 0.10 | 0.10 | Inventive Material |
| 23 | " | B-2 | 7 | 20.8 | 60 | 0.07 | 0.07 | Inventive Material |
| 24 | " | B-5 | " | 21.0 | 20 | 0.15 | 0.18 | Inventive Material |
| 25 | " | B-9 | " | 20.8 | 50 | 0.07 | 0.07 | Inventive Material |
| 26 | " | B-10 | 3 | 21.0 | 90 | 0.18 | 0.13 | Inventive Material |
| 27 | " | " | 7 | 20.3 | 90 | 0.07 | 0.07 | Inventive Material |
| 28 | " | " | 10 | 19.5 | 90 | 0.10 | 0.10 | Inventive Material |
| 29 | A-6 | B-2 | 7 | 21.8 | 70 | 0.07 | 0.07 | Inventive Material |
| 30 | " | B-5 | 7 | 21.9 | 30 | 0.15 | 0.07 | Inventive Material |
| 31 | A-6 | B-8 | 7 | 22.5 | 20 | 0.18 | 0.17 | Inventive Material |
| 32 | " | B-9 | " | 21.8 | 60 | 0.07 | 0.07 | Inventive Material |
| 33 | A-7 | B-1 | 10 | 18.4 | 80 | 0.10 | 0.10 | Inventive Material |
| 34 | " | B-2 | " | 18.8 | 70 | " | " | Inventive Material |
| 35 | " | B-8 | " | 18.8 | 20 | " | " | Inventive Material |
| 36 | " | B-9 | " | 18.6 | 60 | " | " | Inventive Material |
| 37 | A-8 | B-3 | 7 | 18.8 | 70 | 0.07 | 0.07 | Inventive Material |
| 38 | " | B-5 | " | 18.8 | 30 | 0.13 | 0.07 | Inventive Material |
| 39 | " | B-8 | " | 18.8 | 20 | 0.18 | 0.15 | Inventive Material |
| 40 | " | B-9 | " | 18.6 | 60 | 0.07 | 0.07 | Inventive Material |
| 41 | A-9 | B-2 | 10 | 20.8 | 80 | 0.10 | 0.10 | Inventive Material |
| 42 | " | B-5 | " | 21.3 | 50 | " | " | Inventive Material |
| 43 | " | B-8 | " | 21.3 | 30 | " | " | Inventive Material |
| 44 | " | B-9 | " | 21.3 | 70 | " | " | Inventive Material |
| 45 | A-1 | B-5 | 7 | 18.5 | 0 | 0.48 | 0.83 | Comparative |

TABLE 3-continued

| No. | Core No. | Clad No. | Cladding Rate (%) | Tensile Strength σB (kg/mm²) | Corrosion Potential Difference Between Core & clad alloy (mV) | Corrosion Resistance Penetration Depth (mm) | | Remarks |
| --- | --- | --- | --- | --- | --- | --- | --- | --- |
| | | | | | | Tap Water | ASTM+ Cu | |
| 46 | A-4 | B-8 | " | 21.1 | −10 | 1.0 break-through | 1.0 | Comparative material |
| 47 | A-5 | B-1 | 2 | 18.9 | 70 | 0.56 | 0.43 | Comparative material |
| 48 | " | " | 12 | 18.0 | 70 | 0.12 | 0.12 | Inventive material |
| 49 | " | " | 20 | 17.5 | 70 | 0.20 | 0.20 | Inventive material |
| 50 | A-5 | B-10 | 2 | 19.1 | 90 | 0.48 | 0.55 | Comparative material |
| 51 | " | " | 20 | 17.7 | 90 | 0.20 | 0.20 | Inventive material |
| 52 | A-10 | B-1 | 7 | 21.5 | 100 | 0.35 | 0.40 | Comparative material |
| 53 | A-11 | " | 7 | 10.0 | 10 | 0.38 | 0.55 | Comparative material |
| 54 | A-12 | " | 7 | 14.0 | 80 | 0.08 | 0.07 | Comparative material |
| 55 | A-13 | " | 7 | 13.8 | 50 | 0.38 | 0.76 | Comparative material |
| 56 | A-5 | — | — | 22.0 | — | 1.0 break-through | 1.0 | Comparative material no clad |
| 57 | A-13 | — | — | 14.0 | — | break-through | | " |

Cladding ratio = {(thickness of clad material)/(thickness of composite material)} × 100 (%)

The following facts will be seen from the above test results.

(1) Sample Nos. 1 through 44,48,49 and 51 which satisfy all the requirements of the invention are excellent in corrosion resistance and mechanical strength.

(2) Sample Nos. 45 and 46 are for comparison because the corrosion potential difference between the core alloy and clad materials is outside the range of the invention. These samples have very poor resistance to corrosion because little sacrificial anode action develops. Sample No. 46 especially has a minus potential difference (i.e. the potential of the core alloy is less noble than the potential of the clad material), so that the core alloy undergoes considerable break-through corrosion.

(3) Sample Nos. 47 and 50 have cladding ratios smaller than as those in the present invention. With smaller cladding rates, the sacrificial anode action is not shown adequately, so that corrosion resistance is poor.

(4) Sample Nos. 52 through 55 are comparative samples in which the chemical constituents of the core alloy are different from those of the present invention, and are thus extremely poor in strength and/or corrosion resistance. These materials cannot stand practical use.

What is claimed is:

1. An Al alloy composite material for brazed heat exchangers which comprises an Al core alloy essentially consisting of 0.2–1.0 wt% of Si, 0.1–0.5 wt% of Mg, the weight ratio of Si to Mg being in the range of 1–2.5, 0.2–1.0 wt% of Cu, at least one element selected from the group consisting of Mn, Cr and Zr, each contained in an amount of 0.05–0.5 wt%, and the balance being Al and inevitable impurities, and an Al alloy clad layer formed or clad on one side of said core alloy, which side is to be in contact with an aqueous heat transfer medium, said clad layer having a thickness of 3–20% the thickness of said composite material and a less-noble corrosion potential of 20–100 mV than said core alloy.

2. The Al alloy composite material according to claim 1, wherein said core alloy further comprises 0.01–0.1 wt% of Ti.

3. The Al alloy composite material according to claim 1, further comprising a filler alloy on a side of said Al core alloy opposite to the side on which said clad layer is formed.

4. The Al alloy composite material according to any one of the preceding claims, wherein said composite material is in the form of a plate, sheet or tube.

5. An Al alloy composite material for brazed heat exchangers which comprises an Al core alloy consisting essentially of 0.2–1.0 wt% of Si, 0.1–0.5 wt% of Mg, the weight ratio of Si to Mg being in the range of 1–2.5, 0.2–1.0 wt% of Cu, at least one element selected from the group consisting of Mn, Cr and Zr, each contained in an amount of 0.05–0.5 wt%, and the balance being Al and inevitable impurities; and an Al alloy clad layer formed or clad on one side of said core alloy, which side is to be brought into contact with an aqueous heat transfer medium, said clad layer having a thickness of 3–20% of the thickness of said composite material and a less-noble corrosion potential of 20–100 mV than said core alloy, and wherein said Al alloy clad layer consists essentially of Al and inevitable impurities.

6. An alloy composite material for brazed heat exchangers which comprises an Al core alloy consisting essentially of 0.2–1.0 wt% of Si, 0.1–0.5 wt% of Mg, the weight ratio of Si to Mg being in the range of 1–2.5, 0.2–1.0 wt% of Cu, at least one element selected from the group consisting of Mn, Cr and Zr, each contained in an amount of 0.05–0.5 wt%, and the balance being Al and inevitable impurities, and an Al alloy clad layer formed or clad on one side of said core alloy, which side is to be brought into contact with an aqueous heat transfer medium, said clad layer having a thickness of 3–20% of the thickness of said composite material and a less-noble corrosion potential of 20–100 mV than said core alloy, and wherein said Al alloy clad layer consists essentially of at least one element selected from the group consisting of Mn, Cr, Zr and Mg, each contained in the amount of 0.05–0.5 wt% with the balance being Al and inevitable impurities.

7. An Al alloy composite material for brazed heat exchangers which comprises an Al core alloy essentially consisting of 0.2–1.0 wt% of Si, 0.1–0.5 wt% of Mg, the weight ratio of Si to Mg being in the range of 1–2.5, 0.2–1.0 wt% of Cu, at least one element selected from the group consisting of Mn, Cr and Zr, each contained in the amount of 0.05–0.5 wt%, and the balance being Al and inevitable impurities; and an Al alloy clad layer formed or clad on one side of the core alloy, which side is to be brought into contact with an aqueous heat transfer medium, said clad layer having a thickness of 3–20% of the thickness of said composite material and a less-noble corrosion potential of 20–100 mV than said core alloy, and wherein said Al alloy clad layer consists essentially of 0.1–1.0 wt% of Zn, with the balance being Al and inevitable impurities.

8. An Al alloy composite material for brazed heat exchangers which comprises an Al core alloy consisting essentially of 0.2–1.0 wt% of Si, 0.1–0.5 wt% of Mg, the weight ratio of Si to Mg being in the range of 1–2.5, 0.2–1.0 wt% of Cu, at least one element selected from the group consisting of Mn, Cr and Zr, each contained in an amount of 0.05–0.5 wt%, and the balance being Al and inevitable impurities; and a Al alloy clad layer formed or clad on one side of said core alloy, which side is to be brought into contact with an aqueous heat transfer medium, said clad layer having a thickness of 3–20% of the thickness of said composite material and a less-noble corrosion potential of 20–100 mV than said core alloy, and wherein said Al alloy clad layer consists essentially of 0.1–1.0 wt% of Zn, at least one element selected from the group consisting of Mn, Cr, Zr and Mg each contained in an amount of 0.05–0.5 wt%, with the balance being Al and inevitable impurities.

* * * * *